United States Patent
Beaule et al.

(10) Patent No.: US 7,445,709 B2
(45) Date of Patent: Nov. 4, 2008

(54) INSTALLATION FOR TREATING WATER BY FLOATATION

(76) Inventors: Christian Beaule, 975 Crois. Du Ruisseau #407, Ville St-Laurent, PQ (CA) H4L 1E2; Marco Bosisio, 15649 Du Bosquet, Pierre-Fonds, PQ (CA) H9H 1X3; Jean Marchland, 1050 Violette, Laval, PQ (CA) H7X 2G2

( * ) Notice: Subject to any disclaimer, the term of this patent is extended or adjusted under 35 U.S.C. 154(b) by 0 days.

(21) Appl. No.: 10/553,655

(22) PCT Filed: Apr. 16, 2003

(86) PCT No.: PCT/FR03/01224

§ 371 (c)(1),
(2), (4) Date: Jan. 8, 2007

(87) PCT Pub. No.: WO2004/094318

PCT Pub. Date: Nov. 4, 2004

(65) Prior Publication Data

US 2007/0119765 A1    May 31, 2007

(51) Int. Cl.
C02F 1/24 (2006.01)
C02F 1/52 (2006.01)
(52) U.S. Cl. .................................. 210/221.2; 210/521
(58) Field of Classification Search .............. 210/221.2, 210/221.1, 521
See application file for complete search history.

(56) References Cited

U.S. PATENT DOCUMENTS

| | | | |
|---|---|---|---|
| 4,957,633 A * | 9/1990 | Suutarinen | 210/705 |
| 5,120,435 A | 6/1992 | Fink | |
| 5,296,149 A | 3/1994 | Krofta | |
| 5,516,433 A * | 5/1996 | Suutarinen | 210/703 |
| 5,662,804 A | 9/1997 | Dufour | |
| 6,217,777 B1 * | 4/2001 | Dahlquist et al. | 210/703 |

FOREIGN PATENT DOCUMENTS

| | | |
|---|---|---|
| EP | 0 286 707 A | 10/1988 |
| WO | WO-01 60494 A | 8/2001 |

* cited by examiner

*Primary Examiner*—Thomas M Lithgow
(74) *Attorney, Agent, or Firm*—Connolly Bove Lodge & Hutz LLP

(57) ABSTRACT

The invention relates to an installation for treating water by flotation, said installation comprising flotation equipment consisting of a flotation cell (10) into which flocculated raw water mixed with micro-bubbles produced by a pressurization-depressurization system (11) is guided, said cell being provided with a perforated collection device (13) designed in such a way that the surface of the flotation cell is crossed by an identical and uniform flow of water to be treated. The inventive installation comprises capture modules (14) which are arranged in the flotation cell in such a way that the lower part thereof is located at a distance (h) from the perforated collection device (13), said distance being determined such that any disturbance of the uniform distribution established by the perforated collection device is avoided.

8 Claims, 2 Drawing Sheets

INSTALLATION FOR TREATING WATER BY FLOATATION

The present invention relates to an installation for water treatment comprising a flotation cell into which the raw water is introduced, which raw water has, beforehand, been flocculated and then mixed with water which is pressurized and subjected to pressure release such that the suspended matter contained in the raw water are entrained by the microbubbles resulting from said pressure release and discharged at the surface of the liquid contained in the cell, the treated water being drained off via the bottom of said cell.

An installation of the type mentioned above is known (EP-A 0 659 690) which comprises a flocculation zone, a zone for mixing the flocculated raw water, in an upward current, with pressurized water delivered by a pressurization-pressure release system, and a flotation zone, in the upper part of which the suspended matter contained in the raw water and brought to the surface by the microbubbles are discharged, this flotation zone being equipped, in its lower part, with a perforated uptake device (for example, intermediate floor with or without seal assemblies, collectors, etc.) such that the entire surface of the flotation zone exhibits a uniform and identical flow stream for the clarified liquid.

In this prior state of the art, the perforations provided in the uptake device, are smaller in dimension at the final end of the flotation zone (i.e. at the end via which the clarified liquid exists) than at the initial end (via which the raw water to be treated is introduced) or the gaps separating these perforations are greater at the final end of the flotation zone than at the initial end. By virtue of this heterogeneous distribution of the perforations, which produces a dissymmetry at the level of the uptake device, the flow resistance produced by this uptake device of the flotation zone is greater at the final end of this zone than at its initial end and the flow resistance decreases towards the initial end of said zone. Thus, the entire surface of the flotation zone is crossed by an identical and uniform flow of the water to be treated.

One characteristic of this type of installation lies in the formation of a thick bed of microbubbles, by virtue of which the flocculation takes place in two stages, first of all in the flocculation zone and then in the flotation zone, within the bed of microbubbles, by virtue of the considerable contact mass due to the microbubbles providing, moreover, the separation by flotation of the suspended matter. What can be referred to as a turbulent flocculation is thus produced: the bed of bubbles makes it possible i) to increase the treatment velocity and ii) to improve the flocculation and the capturing of the flocculated particles.

In these installations according to the prior state of the art, and when the treatment velocity is high or when the raw water to be treated is very cold, the use of a flotation cell according to EP-A-0-659-690 leads to the entrainment of bubbles in the treated water. At very high velocity, the presence of these bubbles contributes to an increase in turbidity at the outlet of the flotation cell. Added to this drawback is that resulting from the presence of a large amount of bubbles at the outlet of the flotation cell, which can lead to a decrease in the yield from a filter located downstream (for example a sand/anthracite filter) when the installation is intended for the production of drinking water.

The present invention set itself the aim of improving the installations for water treatment by flotation according to the prior state of the art mentioned above, with a view to solving the problems relating to water treatments at high velocity and/or at very low temperature.

Consequently, a subject of the present invention is an installation for water treatment by flotation comprising flotation equipment consisting of a flotation cell into which is introduced flocculated raw water mixed with microbubbles produced by a pressurization-pressure release system, this cell being equipped with a perforated uptake device designed such that the surface of the flotation cell is crossed by an identical and uniform flow of the water to be treated, this installation being characterized in that it comprises capture modules (of the "lamellar module" type or the "transfer module" type, with parallel or cross hydraulic flows) arranged in the flotation cell such that their lower part is located at a distance from the perforated uptake device, this distance being determined so as to avoid any disturbance of the uniform distribution established by said uptake device.

According to the invention, the distance separating the surface of the uptake device from the lower part of the capture modules depends in particular on the geometry of the flotation device, on the flow rate passing through and on the temperature of the raw water to be treated.

According to a preferred embodiment of the present invention, this distance is between 0.05 meter and 1 meter, preferably between 0.15 and 0.60 meter.

Flotation installations are known which comprise lamellar modules. Thus, WO 97/20775 describes a flotation device comprising a floor on which lamellar modules are arranged in order to increase the velocity in the flotation cell. In this prior art, it is necessary to have a homogeneous distribution of the openings provided in the floor and, moreover, the lamellar modules are attached to this floor. In addition, in WO 00/43320, a similar device is found, in which the floor of the flotation cell, which is fixed or revolving, is attached to the lamellar modules. As was mentioned above, in EP-A-0 659 690, use is made of an uptake device, in the flotation cell, in which the perforations are made and arranged so as to produce a dissymmetry at the level of this uptake device, making it possible to obtain an identical and uniform flow of the water to be treated over the entire surface of the flotation cell. The present proprietor has noted, quite surprisingly for those skilled in the art, that this identical and uniform flow over the entire surface of the flotation cell is not disturbed by the presence of capture modules on condition that the latter are positioned at a certain distance from the perforated uptake device.

Other characteristics and advantages of the present invention will emerge from the description given below with reference to the attached drawings which illustrate examples of implementation thereof which are not in any way limiting in nature. In the drawings.

Figure 1:
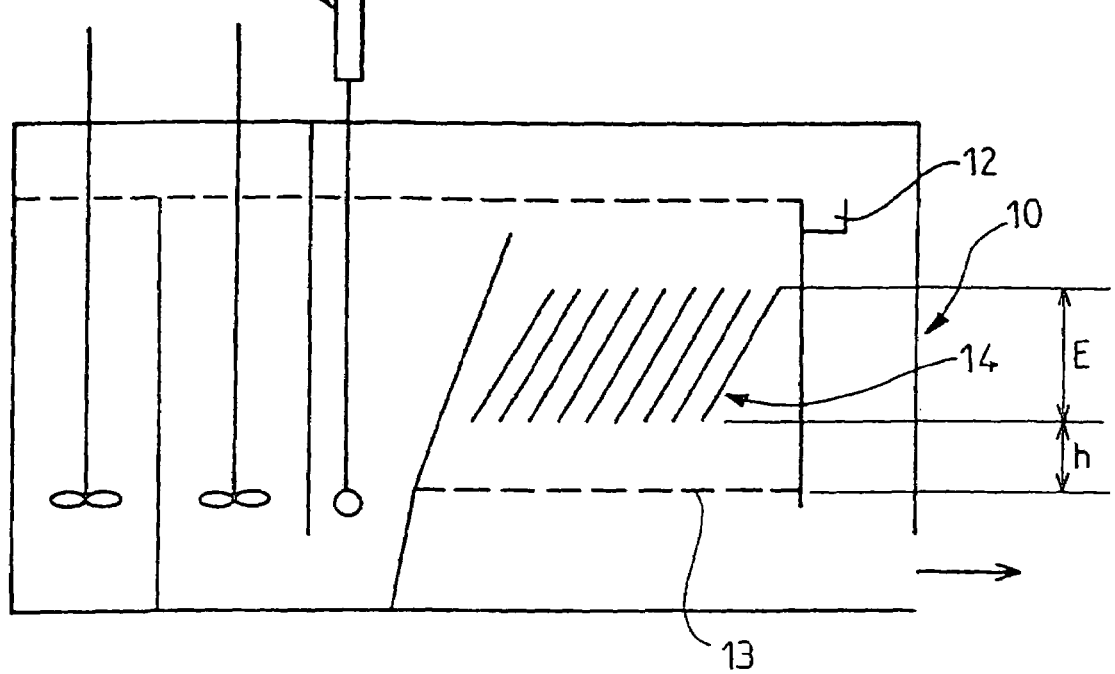
FIG. 1 is a diagrammatical view in vertical longitudinal section of flotation equipment according to an example of implementation of the present invention, equipped with parallel-flow lamellar modules.
Figure 2:
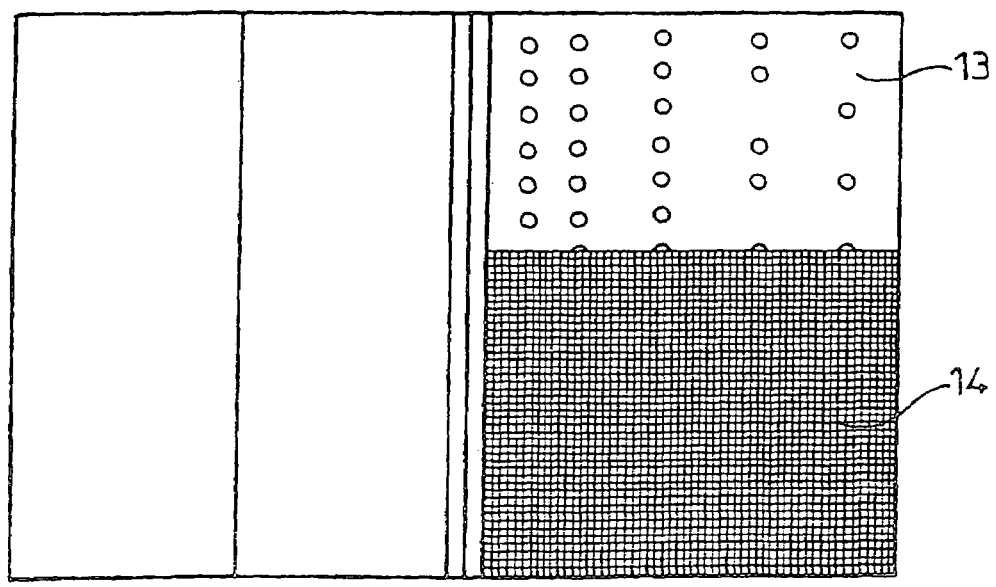
FIG. 2 is a plan view of FIG. 1, on which only half the surface covered by the modules has been represented.

Reference is made first to FIGS. 1 and 2, in which a flotation cell according to EP-A-0 659 690 and improved according to the present invention has been represented.

This flotation cell, denoted in its entirety by the reference 10, receives the raw water mixed with pressurized water delivered by a pressurization-pressure release system represented diagrammatically in 11. The suspended matter, contained in the raw water and brought to the surface by the microbubbles produced by the pressurization-pressure release system 11, are discharged in the upper part of the cell 10 via a chute 12. In its lower part, the cell comprises a system for taking up the treated water which consists of an uptake device 13 with perforations. As was mentioned above, these perforations, have dimensions which are smaller at the final end of the cell 10 than at its initial end, or the gaps separating these perforations are greater at the final end of the flotation zone than at the initial end, this arrangement producing a dissymmetry at the level of the uptake device 13 which ensures an identical and uniform flow over the entire surface of the flotation cell.

According to the present invention, this cell is equipped with capture means which are placed above the perforated uptake device 13, and the lower part of which is located at a certain distance from this device, this distance being determined so as to avoid any disturbance of the uniform distribution of the water to be treated, established by the perforated uptake device.

In the example of implementation illustrated in FIGS. 1 and 2, these capture means are prepared in the form of capture modules 14, with parallel lamellae or tubes, well known to those skilled in the art. For example, these modules may be of the type described in WO 97/20775 and may have a tubular, hexagonal or other profile and an orientation, for example, of 60° to the horizontal. These capture modules direct the flow to be treated in a specific direction.

In FIG. 2, only half the surface covered by the modules 14 has been represented.

The distance h separating the surface of the uptake device 13 from the lower part of the capture modules 14 depends in particular on the geometry of the flotation device, on the rate of through-flow and on the temperature of the water to be treated. By way of example, it may be indicated that this distance can be between 0.05 meter and 1 meter, and preferably between 0.15 and 0.60 meter.

The height E (or thickness) of the modules 14 is chosen as a function of the operating velocity and of the "projected area" of the capture modules. This height can vary between 0.10 and 1 meter, preferably between 0.2 and 0.70 meter. With a view to obtaining a correct cut-off, given the applications and the velocities envisaged (of the order to 20 m/h to 60 m/h), the projected area of the modules (i.e. the active area of the capture zone, also referred to as separation/accumulation zone) will be between 2 and 20 $m^2$ per $m^2$ of flotation device surface equipped with modules.

Figure 3:
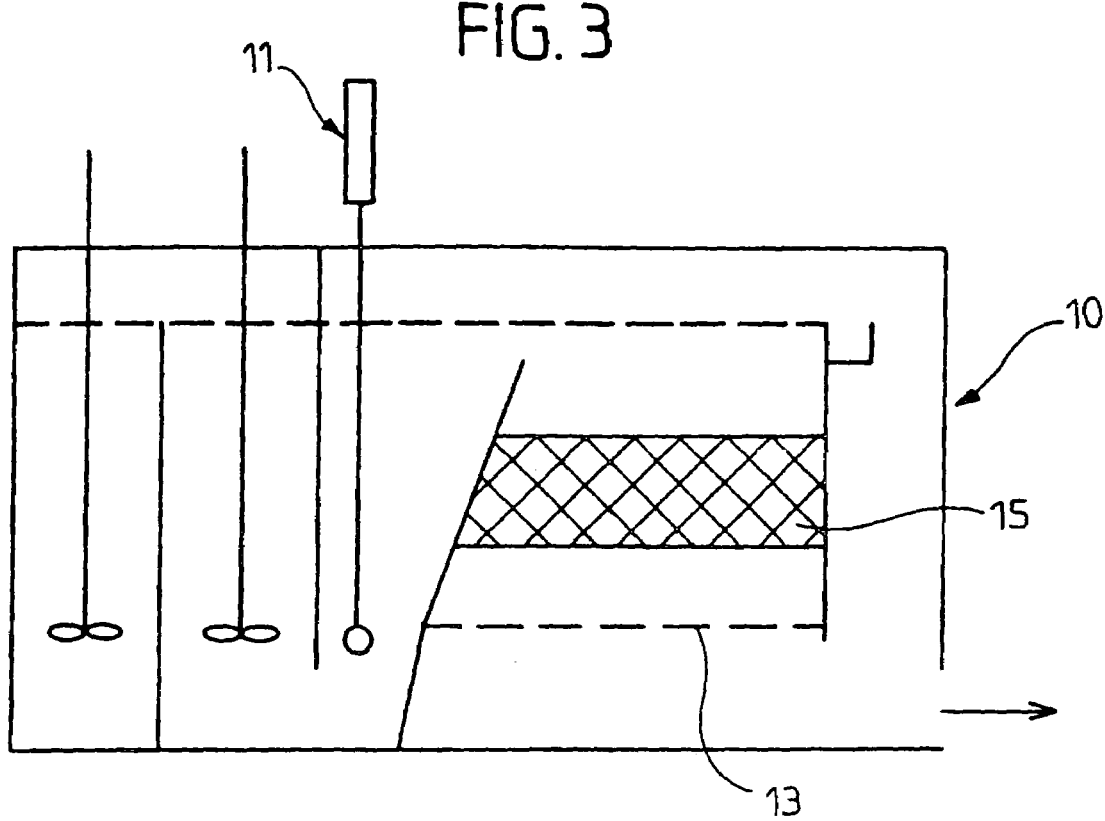
FIG. 3 is a view similar to FIG. 1, illustrating another example of implementation of the invention using cross-flow transfer modules.
Figure 4:
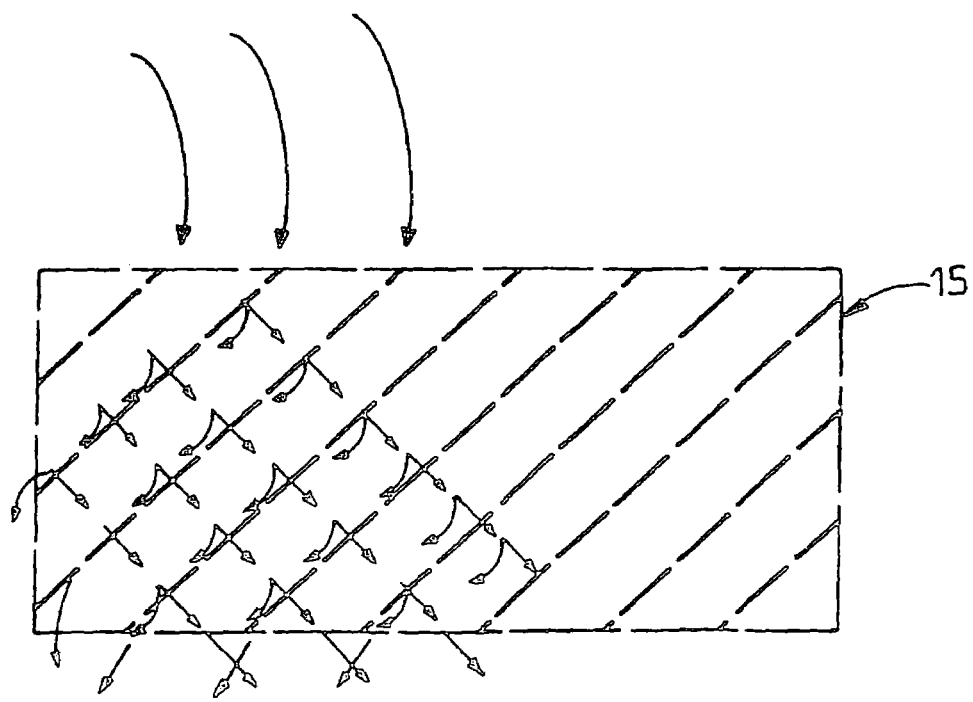
FIG. 4 is a diagrammatical view illustrating the operating principle of a cross-flow transfer module used in the embodiment illustrated in FIG. 3.

In the embodiment illustrated in FIGS. 3 and 4, the capture means are produced in the form of transfer modules 15, the production being, moreover, identical to that illustrated by FIGS. 1 and 2. Such transfer modules, generally non-linear-flow transfer modules, have been represented diagrammatically in FIG. 4. Use may in particular be made of "Brentwood CF" or "Munters FB 10" modules, usually used to improve gas-liquid transfers, oil/water separation, etc. As seen in FIG. 4, they make it possible to combine two directions of circulation of the water to be treated, which increases the turbulence in the modules and promotes coalescence of the microbubbles.

Comparative examples of implementation are given below, making it possible to reveal the advantages and technical effects provided by the present invention, with respect to the prior state of the art.

EXAMPLE 1

Tests were carried out on equipment for raw water treatment in accordance with EP-A-0 659 690. These tests were carried out at very high velocity (40 $m^3/m^2$.h), in cold water, i.e. at a temperature of 0.1 to 1.0° C. During these tests, significant entrainment of bubbles through the uptake device of the flotation cell was noted, which is of course undesirable. The amount of air entrained with the treated water posed a problem in terms of the subsequent filtration of this water in a sand/anthracite filter. The duration of the filtration cycle was very short due to the high amount of air bubbles, causing air embolisms in the filtering medium, the effect of which is to increase the head loss of the filter and to decrease its performance.

The presence of air bubbles in the treated water, in the flotation cell, at very high velocity also has the side effect of entraining solid suspended matter, which increases the turbidity of the treated water. This loss of performance of the installation is also undesirable since an increase in turbidity can also lead to a reduction in the filtration cycle, in a filter located downstream.

Using this known installation, the performance characteristics summarized in the table below were obtained:

| Flotation velocity $m^3/h/m^2$ | Water temperature (° C.) | Cell outlet turbidity NTU | Filter velocity m/h | Duration of filtration hours |
|---|---|---|---|---|
| 40 | 0.2 | 2.5 | 10 | 12 |

The results of these tests confirm that this known installation was not suitable for the treatment of water under the conditions described above.

EXAMPLE 2

Another test was carried out, on water with identical characteristics, with the same installation according to EP-A 0 659 690, equipped with lamellar modules consisting of parallel lamellae (30 cm in height and inclined 60° to the horizontal) and bonded to the uptake device of the flotation cell. These tests gave very poor results, reflected in a notable increase in the turbidity of the water and in the density of the air bubbles at the outlet of the flotation cell. It was concluded therefrom that the presence of a perforated uptake device, with an asymmetric distribution of the water outlet holes, was not compatible with the use of lamellar settling modules whose lower surface rests directly on the surface of this uptake device. This arrangement does not make it possible to obtain an identical and uniform flow over the entire surface of the flotation tank, this characteristic being paramount for obtaining efficient flotation at high velocity. These tests revealed a marked decrease in the quality of the water.

The table below summarizes the results obtained using this installation.

| Flotation velocity $m^3/h/m^2$ | Water temperature (° C.) | Cell outlet turbidity NTU | Filter velocity m/h | Duration of filtration hours |
|---|---|---|---|---|
| 40 | 0.3 | 4.5 | 10 | 6 |

The results of this test confirm that this installation configuration is not suitable.

EXAMPLE 3

Invention

Again under the same treatment conditions and with the same water characteristics, tests were carried out using the installation described in Example 2, the only modification introduced consisting in placing the lower part of the lamellar modules 30 cm above the uptake device, in accordance with FIGS. 1 and 2. The tests made it possible to obtain results which were far superior to those expected. At the outlet of the lamellar modules, the concentration of air bubbles in the water was greatly reduced due to the capture and to the coalescence of these bubbles on the lamellae. Moreover, a certain amount of suspended matter were captured by the lamellae and the coalesced bubbles. A decrease in turbidity was thus obtained, as was a decrease in the amount of air entrained. The results obtained in these tests are summarized in the table below:

| Flotation velocity $m^3/h/m^2$ | Water temperature (° C.) | Cell outlet turbidity NTU | Filter velocity m/h | Duration of filtration hours |
|---|---|---|---|---|
| 40 | 0.2 | 1.0 | 10 | 18 |

It will be noted that the turbidity of the treated water is 1 NTU, which should be compared with the values of 2.5 and 4 NTU obtained in Examples 1 and 2; similarly, the duration of filtration (before clogging of the downstream filter) is here 18 hours, instead of 12 and 6 hours in Examples 1 and 2.

EXAMPLE 4

Invention

Tests were carried out using the installation described above with reference to FIGS. 3 and 4, i.e. an installation in which the flotation cell is equipped with transfer modules whose lower part is located 30 cm above the level of the perforated uptake device. These tests gave excellent results: a very large decrease in the amount of air entrained in the treated water was observed, which notably improves the performances of the installation. The table below summarizes the results obtained in these tests:

| Flotation velocity $m^3/h/m^2$ | Water temperature (° C.) | Cell outlet turbidity NTU | Filter velocity m/h | Duration of filtration hours |
|---|---|---|---|---|
| 40 | 0.4 | 0.4 | 10 | 32 |

Reading of the tables corresponding to Examples 3 and 4 confirms the excellence of the results obtained using the invention, compared to the installations according to the prior state of the art (Examples 1 and 2). It should also be mentioned that, in the context of the tests of Example 4, it was possible to produce treatment velocities of the order of 60 $m^3/h/m^2$ without compromising the level of turbidity of the treated water, at the outlet of the flotation cell, and ensuring satisfactory operating of the sand/anthracite filter placed downstream of the flotation cell.

It remains, of course, that the present invention is not limited to the examples of implementation described and/or represented, but that it encompasses all the variants.

The invention claimed is:

1. Installation for water treatment by flotation having flotation equipment comprising a flotation cell (10) into which is introduced flocculated raw water mixed with microbubbles produced by a pressurization-pressure release system (11), this cell being equipped with a perforated uptake device (13) designed such that the surface of the flotation cell is crossed by an identical and uniform flow of the water to be treated, this installation further comprising capture modules (14, 15) arranged in the flotation cell such that their lower part is located at a distance (h) from the perforated uptake device (13), this distance being determined so as to avoid any disturbance of the uniform distribution established by the perforated uptake device which is situated in the lower part of the cell.

2. Installation according to claim 1, wherein the distance (h) separating the surface of the uptake device (13) from the lower part of the capture modules (14, 15) depends in particular on the geometry of the flotation device, on the rate of through-flow and on the temperature of the water to be treated.

3. Installation according to claim 1, wherein the distance (h) separating the surface of the uptake device (13) from the lower part of the capture modules (14, 15) is between 0.05 meter and 1 meter, preferably between 0.15 and 0.60 meter.

4. Installation according to claim 1, wherein the height or thickness (E) of the capture modules (14, 15) is determined as a function of the operating velocity and of the projected area of said capture modules.

5. Installation according to claim 4, wherein said height or thickness (E) is between 0.10 and 1 meter, preferably between 0.2 and 0.70 meter.

6. Installation according to claim 1, wherein the projected area of the capture modules, i.e. the active area of the separation/accumulation zone, is between 2 and 20 $m^2$ per $m^2$ of flotation device surface equipped with modules.

7. Installation according to claim 1, wherein the capture modules are of the lamellar type, in particular with parallel lamellae (14), with a tubular or hexagonal profile, and with direct or cross flow.

8. Installation according to claim 1, wherein the capture modules are of the transfer module type (15), in general of the non-linear-flow transfer module type, providing two directions of circulation of the water to be treated.

* * * * *

UNITED STATES PATENT AND TRADEMARK OFFICE
CERTIFICATE OF CORRECTION

PATENT NO.        : 7,445,709 B2  
APPLICATION NO.   : 10/553655  
DATED             : November 4, 2008  
INVENTOR(S)       : Christian Beaule et al.

Page 1 of 1

It is certified that error appears in the above-identified patent and that said Letters Patent is hereby corrected as shown below:

On the Title page of the Letters Patent:

At (76) Inventors, Marchland should read --Marchand--

Signed and Sealed this

Twentieth Day of January, 2009

JON W. DUDAS
*Director of the United States Patent and Trademark Office*